United States Patent
Zhang et al.

(10) Patent No.: US 12,334,813 B2
(45) Date of Patent: Jun. 17, 2025

(54) RECTIFICATION CONTROL SYSTEM, CHARGER AND CONTROL METHOD FOR CHARGER

(71) Applicant: CRRC QINGDAO SIFANG ROLLING STOCK RESEARCH INSTITUTE CO., LTD., Qingdao (CN)

(72) Inventors: Lijun Zhang, Qingdao (CN); Xuqiang Zhao, Qingdao (CN); Haiyang Li, Qingdao (CN); Bowei Zhu, Qingdao (CN); Zhuangzhuang Shen, Qingdao (CN); Xiantao Chu, Qingdao (CN); Long Li, Qingdao (CN); Maoqun Zhou, Qingdao (CN)

(73) Assignee: CRRC QINGDAO SIFANG ROLLING STOCK RESEARCH INSTITUTE CO., LTD., Qingdao (CN)

( * ) Notice: Subject to any disclaimer, the term of this patent is extended or adjusted under 35 U.S.C. 154(b) by 0 days.

(21) Appl. No.: 19/011,342

(22) Filed: Jan. 6, 2025

(65) Prior Publication Data

US 2025/0141343 A1    May 1, 2025

Related U.S. Application Data

(63) Continuation of application No. PCT/CN2023/126780, filed on Oct. 26, 2023.

(30) Foreign Application Priority Data

Sep. 27, 2023   (CN) .......................... 202311270828.4

(51) Int. Cl.
*H02M 1/32*    (2007.01)
*H02M 1/10*    (2006.01)
*H02M 7/219*   (2006.01)

(52) U.S. Cl.
CPC ............. *H02M 1/325* (2021.05); *H02M 1/10* (2013.01); *H02M 7/219* (2013.01)

(58) Field of Classification Search
CPC .......... H02M 1/32; H02M 1/10; H02M 7/219; H02M 1/325
See application file for complete search history.

(56) References Cited

U.S. PATENT DOCUMENTS

| 6,266,260 B1 * | 7/2001 | Zahrte, Sr. ............. | H02J 9/062 363/132 |
| 2019/0036366 A1 * | 1/2019 | Dohmeier ................ | H02J 7/02 |

(Continued)

FOREIGN PATENT DOCUMENTS

| CN | 109842287 A | 6/2019 |
| CN | 111344937 A | 6/2020 |

(Continued)

OTHER PUBLICATIONS

International Search Report for PCT/CN2023/126780.
Search Report of the priority application CN202311270828.4.

*Primary Examiner* — Gustavo A Rosario-Benitez
(74) *Attorney, Agent, or Firm* — J.C. PATENTS

(57) ABSTRACT

The present application relates to a rectification control system, a charger and a control method for a charger. The rectification control system includes: a Vienna rectifier, which includes input terminals and output terminals, an output capacitor circuit, and a rectifying circuit which includes a u-phase bridge arm branch, a v-phase bridge arm branch and a w-phase bridge arm branch, each bridge arm branch comprising a switch device and a bidirectional switch unit which are connected in series; a voltage acquisition unit, which is connected to the three input terminals and is configured to acquire voltages $U_{uv}$, $U_{vw}$ and $U_{wu}$; a fault detection unit, which is connected to the bidirectional switch units and is configured to detect whether any of the (Continued)

bidirectional switch units fails; and a control unit, which is connected to the voltage acquisition unit and the fault detection unit and is configured to control closing or opening of three switch devices according to voltage input format, voltage connection mode and detection result of the fault detection unit, so as to switch circuit and working mode, making a charger suitable for applications in multiple scenarios and multiple formats.

9 Claims, 4 Drawing Sheets

(56) References Cited

U.S. PATENT DOCUMENTS

| | | | |
|---|---|---|---|
| 2020/0044562 A1* | 2/2020 | Alipour | H02M 1/4216 |
| 2022/0029529 A1* | 1/2022 | Chen | H02M 7/797 |
| 2022/0227242 A1* | 7/2022 | Schafmeister | H02J 7/02 |
| 2024/0055855 A1* | 2/2024 | Wang | H02H 9/02 |
| 2024/0227591 A1* | 7/2024 | Liu | H02J 7/0031 |

FOREIGN PATENT DOCUMENTS

| | | | | |
|---|---|---|---|---|
| CN | 111404221 A | 7/2020 | | |
| CN | 112600447 A | 4/2021 | | |
| CN | 213027811 U | 4/2021 | | |
| CN | 114094852 A | 2/2022 | | |
| CN | 114884316 A | 8/2022 | | |
| CN | 217935450 U | 11/2022 | | |
| FR | 3089721 A1 * | 6/2020 | | H02J 3/322 |
| WO | WO2017127112 A1 | 7/2017 | | |
| WO | WO2019091914 A1 | 5/2019 | | |

* cited by examiner

RECTIFICATION CONTROL SYSTEM, CHARGER AND CONTROL METHOD FOR CHARGER

This application is a continuation of the international application PCT/CN2023/126780, filed on Oct. 26, 2023, which claims priority to the Chinese patent application 202311270828.4 filed on Sep. 27, 2023 and entitled "Rectification control system, Charger and Control Method for Charger", the entire contents of the above identified applications are incorporated herein by reference.

TECHNICAL FIELD

The present application relates to the technical field of power electronic converters, and in particular to a rectification control system, a charger, and a control method for the charger.

BACKGROUND ART

The Vienna rectifier is a new type of three-phase PWM rectifier topology invented by Professor J. W. Kolar and others from Vienna University in Austria in the 1990s. The Vienna rectifier is a power factor correction (PFC) circuit, which belongs to a three-level PWM rectifier topology. During normal operation, the maximum voltage that the switch tube can withstand is half of the DC bus voltage, and there is no shoot-through phenomenon for the switch tube. Compared with other topologies, at the same switching frequency, the Vienna rectifier has small inductor ripples, a smaller inductor size, and a relatively higher power density, as well as lower harmonics of the input current. Therefore, in the application of three-phase rectifiers with high power factor and low current harmonics, especially in the fields of new energy vehicle charging piles, on-board chargers, and aircraft generators in recent years, three-phase Vienna rectifiers have been widely used.

However, conventional three-phase Vienna rectifiers can only be used in situations where three-phase AC input is available, which limits their application flexibility and cannot meet the convenient demand for timely charging in different application scenarios. When a phase loss occurs, the existing conventional control method is to identify the phase loss fault and then shut down for protection, which will inevitably affect the continuity of power supply to the load.

SUMMARY

In view of at least one shortcoming in the prior art, embodiments of the present application provide a rectification control system, a charger and a control method for the charger, so that the charger is suitable for applications in multiple scenarios and multiple formats.

In a first aspect, an embodiment of the present application provides a rectification control system, comprising:
a Vienna rectifier, which comprises:
three input terminals, namely a u terminal, a v terminal and a w terminal;
two output terminals, namely a dc+ terminal and a dc− terminal;
an output capacitor circuit, coupled between the two output terminals, the output capacitor circuit comprising a first capacitor C1 and a second capacitor C2 connected in series and an intermediate node located between the first capacitor C1 and the second capacitor C2;
a rectifying circuit, comprising three bridge arm branches, namely a u-phase bridge arm branch connected between the u terminal and the intermediate node, a v-phase bridge arm branch connected between the v terminal and the intermediate node, and a w-phase bridge arm branch connected between the w terminal and the intermediate node, each of the bridge arm branches comprising a switch device and a bidirectional switch unit connected in series;
a voltage acquisition unit, connected to the three input terminals and configured to acquire a voltage $U_{uv}$ between the u terminal and the v terminal, a voltage $U_{vw}$ between the v terminal and the w terminal, and a voltage $U_{wu}$ between the w terminal and the u terminal;
a fault detection unit, connected to bidirectional switch units and configured to detect whether any of the bidirectional switch units fails;
a control unit, connected to the voltage acquisition unit and the fault detection unit, and configured to determine voltage input format and voltage connection scheme according to voltages acquired by the voltage acquisition unit, and control closing or opening of three switch devices to switch circuit and operating mode according to the voltage input format, the voltage connection scheme and detection result of the fault detection unit.

In some embodiments of the first aspect of the present application, the control unit is further configured to:
When the voltages $U_{uv}$, $U_{vw}$ and $U_{wu}$ acquired by the voltage acquisition unit are all AC voltages, determine the voltage input format as three-phase AC input;
When only one of the voltages $U_{uv}$, $U_{vw}$ and $U_{wu}$ acquired by the voltage acquisition unit is an AC voltage, determine the voltage input format as single-phase AC input;
When only one of the voltages $U_{uv}$, $U_{vw}$ and $U_{wu}$ acquired by the voltage acquisition unit is a DC voltage, determine the voltage input format as DC input.

In some embodiments of the first aspect of the present application, when the voltage input format is the three-phase AC input, the control unit is further configured to:
if none of the bidirectional switch units in the three bridge arm branches fail, close the three switch devices, and the operating mode is three-phase Vienna rectification operating mode;
if the bidirectional switch unit in only one of the three bridge arm branches fails, close the switch devices in the other two fault-free bridge arm branches, and the operating mode is single-phase Vienna rectification operating mode;
if the bidirectional switch units in at least two of the three bridge arm branches fail, keep the three switch devices in an open state, and the operating mode is three-phase uncontrolled rectification operating mode.

In some embodiments of the first aspect of the present application, when the voltage input format is the single-phase AC input, the control unit is further configured to:
if neither of the bidirectional switch units in two bridge arm branches connected to the AC voltage fails, close the switch devices in the two bridge arm branches connected to the AC voltage, and the operating mode is single-phase Vienna rectification operating mode;
if at least one bidirectional switch unit in the two bridge arm branches connected to the AC voltage fails, keep the three switch devices in an open state, and the operating mode is single-phase uncontrolled rectification operating mode.

In some embodiments of the first aspect of the present application, wherein when the voltage input format is the DC input, the control unit is further configured to:
if neither of the bidirectional switch units in two bridge arm branches connected to the DC voltage fails, close the switch devices in the two bridge arm branches connected to the DC voltage, and the operating mode is DC/DC Boost operating mode;
if at least one bidirectional switch unit in the two bridge arm branches connected to the DC voltage fails, keep the three switch devices in an open state, and the operating mode is DC input operating mode.

In some embodiments of the first aspect of the present application, the switch devices are single-stage contactors, and each of the bidirectional switch units comprises two switch tubes connected in reverse series.

In some embodiments of the first aspect of the present application, the Vienna rectifier further comprises a filtering circuit, the filtering circuit comprises three inductors, each of the three inductors is connected between one of the input terminals and one of the bridge arm branches.

In some embodiments of the first aspect of the present application, the rectification control system further comprises three groups of diodes respectively connected to the three inductors, each group of diodes comprises a first diode and a second diode, an anode of the first diode is connected to respective inductor, a cathode of the first diode is connected to the dc+ terminal, an anode of the second diode is connected to the dc− terminal, and a cathode of the second diode is connected to the respective inductor.

In a second aspect, an embodiment of the present application provides a charger, comprising the rectification control system according to any one of the embodiments in the first aspect.

In a third aspect, an embodiment of the present application provides a control method for a charger, which adopts the rectification control system according to any one of the embodiments in the first aspect, comprising following steps:
acquiring voltages: acquiring the voltage $U_{uv}$ between the u terminal and the v terminal, the voltage $U_{vw}$ between the v terminal and the w terminal, and the voltage $U_{wu}$ between the w terminal and the u terminal;
determining voltage input formats and voltage connection scheme: if $U_{uv}$, $U_{vw}$ and $U_{wu}$ are all AC voltages, determining the voltage input format as three-phase AC input, and the voltage connection scheme as $u_{vw}$ connection; if only one of $U_{uv}$, $U_{vw}$ and $U_{wu}$ is an AC voltage, determining the voltage input format as single-phase AC input, where if $U_{uv}$ is an AC voltage, determining the voltage connection scheme as uv connection, if $U_{vw}$ is an AC voltage, determining the voltage connection scheme as vw connection, if $U_{wu}$ is an AC voltage, determining the voltage connection scheme as wu connection; if only one of $U_{uv}$, $U_{vw}$ and $U_{wu}$ is a DC voltage, determining the voltage input format as DC input, where if $U_{uv}$ is a DC voltage, determining the voltage connection scheme as uv connection, if $U_{vw}$ is a DC voltage, determining the voltage connection scheme as vw connection, if $U_{wu}$ is a DC voltage, determining the voltage connection scheme as wu connection;
detecting faults in the bridge arm branches: detecting whether any of the bidirectional switch units in the three bridge arm branches fails, and if a fault is detected, determining the bridge arm branch where the fault occurs is faulty;
switching circuit and operating mode:
when the voltage input format is the three-phase AC input, if none of the three bridge arm branches fail, closing the three switch devices to select three-phase Vienna rectification operating mode; if only one of the three bridge arm branches fails, closing the switch devices in the other two fault-free bridge arm branches to select single-phase Vienna rectification operating mode; if at least two of the three bridge arm branches fail, keeping the three switch devices in an open state to select three-phase uncontrolled rectification operating mode;
when the voltage input format is the single-phase AC input, if neither of two bridge arm branches connected to the AC voltage fails, closing the switch devices in the two bridge arm branches connected to the AC voltage to select the single-phase Vienna rectification operating mode; if at least one of the two bridge arm branches connected to the AC voltage fails, keeping the three switch devices in an open state to select single-phase uncontrolled rectification operating mode;
when the voltage input format is the DC input, if neither of two bridge arm branches connected to the DC voltage fails, closing the switch devices in the two bridge arm branches connected to the DC voltage to select DC/DC Boost operating mode; if at least one of the two bridge arm branches connected to the DC voltage fails, keeping the three switch devices in an open state to select DC input operating mode;
charger operation: according to the selected operating mode, starting the charger to operate and output DC voltage.

Compared with the prior art, the present application has at least the following advantages and positive effects: the rectification control system, charger and charger control method provided by at least one embodiment of the present application can respectively controls the conductive and non-conductive states of the three bridge arm branches to switch between different circuits according to the voltage input format and the current status of the rectifying circuit. This allows compatibility with three different scenarios of DC input, single-phase AC input and three-phase AC input and has six different operating modes, which expands the application range of the Vienna rectifier and improves flexibility, reduces the cost, and makes it easy to be promoted.

The details of one or more embodiments of the present application are set forth in the following drawings and description to make other features, objects, and advantages of the present application more readily apparent.

BRIEF DESCRIPTION OF THE DRAWINGS

The drawings described herein are used to provide a further understanding of the present application and constitute a part of the present application. The illustrative embodiments of the present application and their descriptions are used to explain the present application and do not constitute an improper limitation on the present application. In the drawings.

In the Figures.

Figure 1:
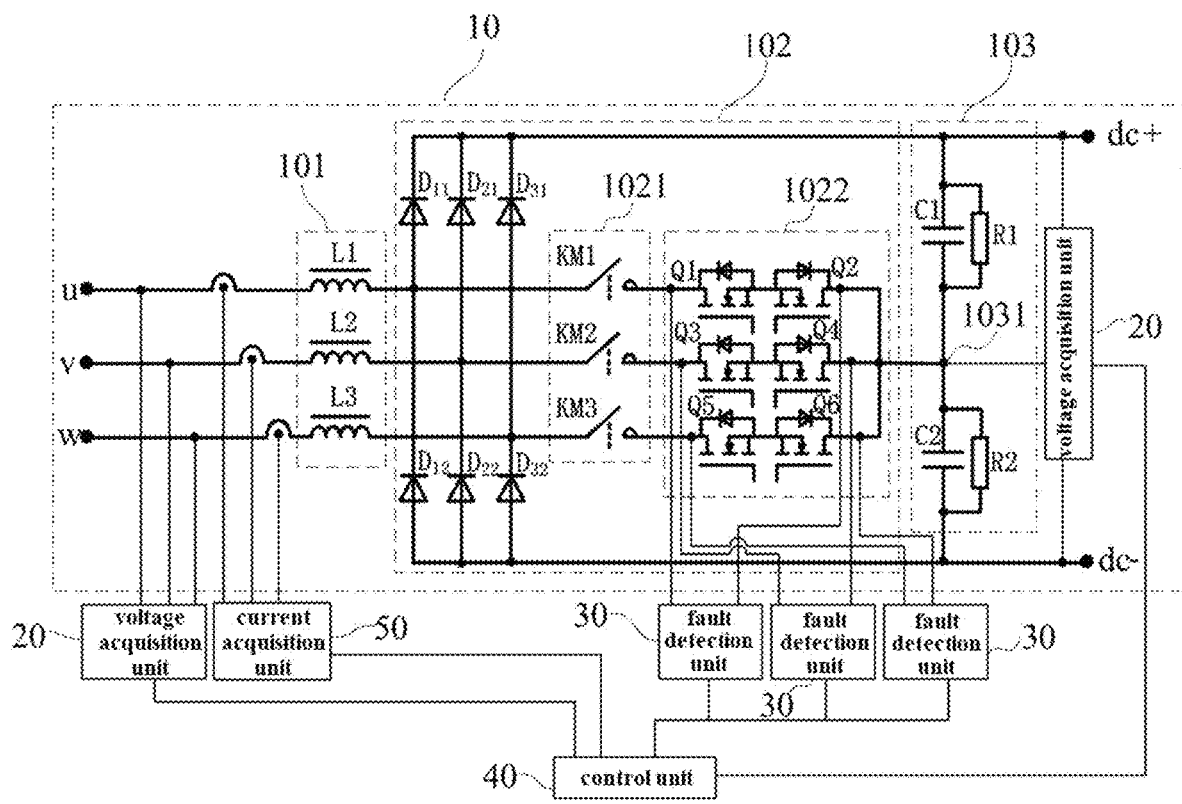
FIG. 1 is a topological diagram of a rectification control system provided in an embodiment of the present application.

10, Vienna rectifier; 101, filtering circuit; 102, rectifying circuit; 1021, switch device; 1022, bidirectional switch unit; 103, output capacitor circuit; 1031, intermediate node; 20, voltage acquisition unit; 30, fault detection unit; 40, control unit; 41, processor; 42, memory; 43, communication interface; 44, bus; 50, current acquisition unit.

DETAILED DESCRIPTION OF EMBODIMENTS

In order to make the purpose, technical solutions and advantages of the present application more clearly understood, the present application is described and illustrated below in conjunction with the accompanying drawings and embodiments. It should be understood that the specific embodiments described herein are only used to explain the present application and are not intended to limit the present application. Based on the embodiments provided in the present application, all other embodiments obtained by a person of ordinary skill in the art without making creative work are within the scope of protection of the present application.

Apparently, the accompanying drawings in the following description are merely some of the examples or embodiments of the present application. For a person of ordinary skill in the art, without paying any creative effort, the present application can also be applied to other similar circumstances according to these accompanying drawings. In addition, it should also be understood that, although the effort made in the development process may be complicated and tedious, for a person of ordinary skill in the art related to the disclosure of the present application, some modifications in design, manufacture or production based on the technical contents disclosed by the present application are merely conventional technical means, and it should not be understood that the disclosure of the present application is insufficient.

The term "embodiment" herein means that specific features, structures or characteristics described with reference to an embodiment can be included in at least one embodiment of the present application. The appearance of "embodiment" in various places of the description neither necessarily refers to the same embodiment, nor means an independent or alternative embodiment that is mutually exclusive with other embodiments. It should be explicitly and implicitly understood by those skilled in the art that an embodiment can be combined with other embodiments if not conflicted.

Unless otherwise defined, the technical terms or scientific terms involved in the present application should have their ordinary meanings as understood by a person of ordinary skill in the technical field to which the present application pertains. Similar words such as "a", "an", "one" and "the" involved in the present application do not mean any quantity limitation, and may mean a singular or plural form. The terms such as "include", "comprise" and "have" and variants thereof involved in the present application are intended to cover non-exclusive inclusion. For example, a process, method, system, product or device including a series of steps or modules (units) is not limited to the listed steps or units, and may optionally include steps or units that are not listed or optionally include other steps or units intrinsic to this process, method, product or device. Similar words such as "connect", "link" and "couple" involved in the present application are not limited to physical or mechanical connection, and may include electrical connection, regardless of direct or indirect connection. The term "a plurality of" involved in the present application means two or more. "And/or" describes an association relationship of associated objects, indicating that there may be three relationships, for example, "A and/or B" can mean: A exists alone, A and B exist at the same time, and B exists alone. The character "/" generally indicates that the objects before and after are in an "or" relationship. The terms "first" and "second", "third", etc. involved in the present application are merely for distinguishing similar objects, rather than indicating a specific order for the objects.

A first aspect of the present application provides a rectification control system, which can be used in a charger, enabling the charger to be compatible with three voltage input formats: DC (Direct Current) input, single-phase AC (Alternating Current) input and three-phase AC input, and has six operating modes, making the charger suitable for applications in multiple scenarios and multiple formats.

The rectification control system provided in an embodiment of the present application comprise: a Vienna rectifier 10, a voltage acquisition unit 20, a fault detection unit 30 and a control unit 40.

A topology diagram of the Vienna rectifier in the embodiment of the present application is shown in FIG. 1. The Vienna rectifier 10 comprises three input terminals and two output terminals; the three input terminals are used to connect to a power supply and are respectively named as a u terminal, a v terminal and a w terminal, and the two output terminals are used to output rectified DC voltage and are respectively named as a dc+ terminal and a dc− terminal.

A filtering circuit 101, a rectifying circuit 102 and an output capacitor circuit 103 are sequentially connected between the input terminals and the output terminals.

The filtering circuit 101 comprises three inductors L1, L2, and L3, which are respectively connected to the u terminal, the v terminal, and the w terminal. The rectifying circuit 102 comprises three bridge arm branches, namely a u-phase bridge arm branch connected to the u terminal, a v-phase bridge arm branch connected to the v terminal, and a w-phase bridge arm branch connected to the w terminal. Each bridge arm branch comprises a switch device 1021 and a bidirectional switch unit 1022 connected in series.

The output capacitor circuit 103 is coupled between the two output terminals dc+ and dc−. The output capacitor circuit 103 comprises a first capacitor C1 and a second capacitor C2 connected in series, with an intermediate node 1031 located between the first capacitor C1 and the second capacitor C2; voltage-equalizing discharge resistors R1 and R2 are respectively connected in parallel to the first capacitor C1 and the second capacitor C2.

Specifically, in some embodiments, the u-phase bridge arm branch connects the inductor L1 and the intermediate node 1031, the v-phase bridge arm branch connects the inductor L2 and the intermediate node 1031, and the w-phase bridge arm branch connects L3 and the intermediate node 1031.

In some embodiments, the rectifying circuit 102 further comprises three groups of diodes respectively connected to the three inductors L1, L2 and L3, each group of diodes includes a first diode $D_{i1}$ and a second diode $D_{i2}$, an anode of the first diode $D_{i1}$ is connected to respective inductor, a cathode of the first diode Din is connected to the dc+ terminal, an anode of the second diode $D_{i2}$ is connected to the dc− terminal, and a cathode of the second diode $D_{i2}$ is connected to the respective inductor. Specifically, in the rectifying circuit, there are 6 diodes, namely three first diodes $D_{11}, D_{21}, D_{31}$ and three second diodes $D_{12}, D_{22}, D_{32}$.

In the embodiment shown in FIG. 1, an output terminal of the inductor L1 is simultaneously connected to an anode of the first diode $D_{11}$ and a cathode of the second diode $D_{12}$ in the first group of diodes, a cathode of the first diode $D_{11}$ in the first group of diodes is connected to the dc+ terminal and a positive electrode of the first capacitor C1, and an anode of the second diode $D_{12}$ in the first group of diodes is connected to the dc− terminal and a negative electrode of the second capacitor C2; an output terminal of the inductor L2 is simultaneously connected to an anode of the first diode $D_{21}$ and a cathode of the second diode $D_{22}$ in the second group of diodes, a cathode of the first diode $D_{21}$ in the second group of diodes is connected to the dc+ terminal and the positive electrode of the first capacitor C1, and an anode of the second diode $D_{22}$ in the second group of diodes is connected to the dc− terminal and the negative electrode of the second capacitor C2; an output terminal of the inductor L3 is simultaneously connected to an anode of the first diode $D_{31}$ and a cathode of the second diode $D_{32}$ in the third group of diodes, a cathode of the first diode $D_{31}$ in the third group of diodes is connected to the dc+ terminal and the positive electrode of the first capacitor C1, and an anode of the second diode $D_{32}$ in the third group of diodes is connected to the dc− terminal and the negative electrode of the second capacitor C2.

In some embodiments, as shown in FIG. 1, switch devices 1021 may be single-stage contactors KM1, KM2 and KM3, which control the closing and opening of the movable contacts by energizing and de-energizing the electromagnets, thereby controlling the conductive and non-conductive of the respective bridge arm branch and enabling circuit switching with sensitivity, reliability, and rapid response. It is understandable that those skilled in the art can also reasonably select other switch devices that can separately control the conductive and non-conductive of a single bridge arm branch, and the present application does not impose any restrictions on it.

In some embodiments, each bidirectional switch unit 1022 comprises two switch tubes connected in reverse series, and the two switch tubes in each bidirectional switch unit 1022 are controlled by a single driving signal; there are a total of 6 switch tubes in the rectifying circuit. Specifically, as shown in FIG. 1, the bidirectional switch unit 1022 in the u-phase bridge arm branch includes switch tubes Q1 and Q2 connected in series, the bidirectional switch unit 1022 in the v-phase bridge arm branch includes switch tubes Q3 and Q4 connected in series, and the bidirectional switch unit 1022 in the w-phase bridge arm branch includes switch tubes Q5 and Q6 connected in series. Optionally, the switch tubes Q1~Q6 can be power switch devices such as IGBTs or MOSFETs.

The voltage acquisition unit 20 is connected to the three input terminals u, v, w and the two output terminals dc+ and dc−, and is configured to acquire voltages at the input terminals and the output terminals. In particular, the voltage acquisition unit 20 is configured to acquire a voltage $U_{uv}$ between the u terminal and the v terminal, a voltage $U_{vw}$ between the v terminal and the w terminal, and a voltage $U_{wu}$ between the w terminal and the u terminal, so that the voltage input format can be determined according to the voltages. Optionally, the voltage acquisition unit 20 is a voltage sensor, which detects the voltages at the terminals and converts them into a signal for output.

The fault detection unit 30 is connected to the bidirectional switch unit 1022 in each bridge arm branch, and is used to detect whether any of the bidirectional switch units 1022 fails. In some embodiments, the fault detection unit 30 is used to detect faults of the switch tubes Q1 to Q6 and drive faults. It should be noted that those skilled in the art can select fault detection methods from existing technologies as needed for fault detection, and the present application will not go into details. Optionally, the fault detection unit 30 may be a driver board. Switch tubes such as IGBTs or MOSFETs usually come with a driver board, and the driver board has the functionality to detect faults in the switch tubes.

Specifically, if a fault is detected in the bidirectional switch unit in the u-phase bridge arm branch, it is determined that the u-phase bridge arm branch has failed; if a fault is detected in the bidirectional switch unit in the v-phase bridge arm branch, it is determined that the v-phase bridge arm branch has failed; if a fault is detected in the bidirectional switch unit in the w-phase bridge arm branch, it is determined that the w-phase bridge arm branch has failed. The fault status of the bridge arm branches can be used to judge the current status of the rectifying circuit. For example, if a bridge arm branch fails, the system can be shut down in time, and then restarted and switched to the appropriate operating mode to continue operation according to the current status.

The control unit 40 is connected to the voltage acquisition unit 20 and the fault detection unit 30, and is configured to determine the voltage input format and voltage connection scheme according to the voltages acquired by the voltage acquisition unit 20, and control the closing or opening of the three switch devices 1021 according to the voltage input format and the voltage connection scheme as well as the detection result of the fault detection unit 30. This allows the system to switch the circuit and select the appropriate operating mode according to the different voltage input formats and the current status of the rectifying circuit.

In some embodiments, the control unit 40 is configured as follows: when the voltages $U_{uv}$, $U_{vw}$ and $U_{wu}$ acquired by the voltage acquisition unit 20 are all AC voltages, the voltage input format is determined to be three-phase AC input; when only one of the voltages $U_{uv}$, $U_{vw}$ and $U_{wu}$ acquired by the voltage acquisition unit 20 is an AC voltage, the voltage input format is determined to be single-phase AC input; when only one of the voltages $U_{uv}$, $U_{vw}$ and $U_{wu}$ acquired by the voltage acquisition unit 20 is a DC voltage, the voltage input format is determined to be DC input.

In some embodiments, the control unit 40 is further configured to determine the voltage connection scheme based on the voltages acquired by the voltage acquisition unit 20, specifically as follows: when the voltage input format is three-phase AC input, the voltage connection scheme is determined to be $u_{vw}$ connection; when the voltage input format is single-phase AC input: if $U_{uv}$ is an AC voltage, the voltage connection scheme is determined to be uv connection; if $U_{vw}$ is an AC voltage, the voltage connection scheme is determined to be vw connection; if $U_{wu}$ is an AC voltage, the voltage connection scheme is determined to be wu connection; when the voltage input format is DC input: if $U_{uv}$ is a DC voltage, the voltage connection scheme is determined to be uv connection; if $U_{vw}$ is a DC voltage, the voltage connection scheme is determined to be vw connection; if $U_{wu}$ is a DC voltage, the voltage connection scheme is determined to be wu connection.

Figure 2:
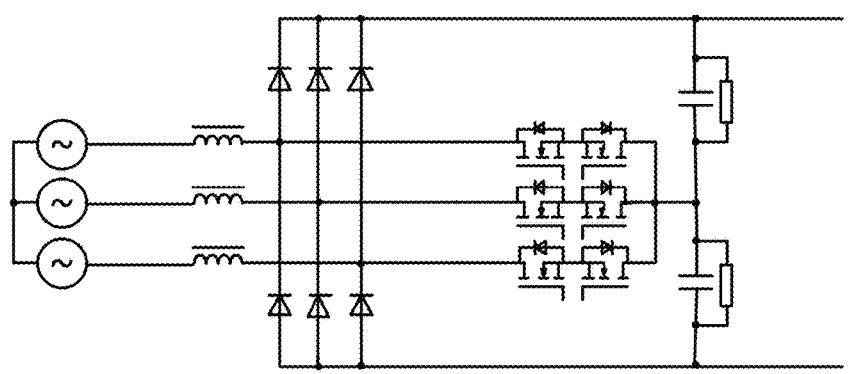
FIG. 2 is an equivalent circuit diagram of the rectification control system of the embodiment in a three-phase Vienna rectification operating mode.
Figure 3:
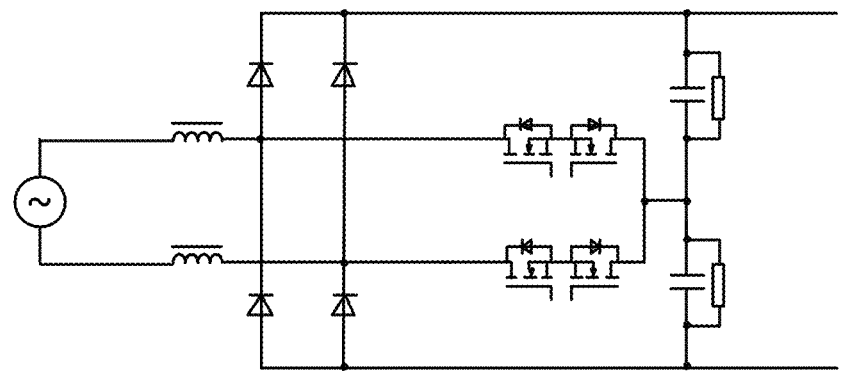
FIG. 3 is an equivalent circuit diagram of the rectification control system of the embodiment in a single-phase Vienna rectifier operating mode.
Figure 4:
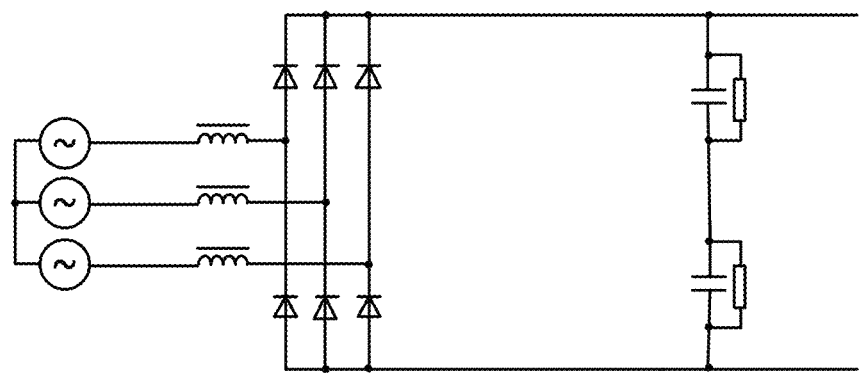
FIG. 4 is an equivalent circuit diagram of the rectification control system of the embodiment in a three-phase uncontrolled rectification operating mode.

In some embodiments, when the voltage input format is the three-phase AC input, the control unit 40 is further configured as follows:

if none of the bidirectional switch units 1022 in the three bridge arm branches fail, the three switch devices 1021 are closed, causing all the three bridge arm branches to be conductive, and the operating mode is three-phase Vienna rectification operating mode; an equivalent circuit in this operating mode is shown in FIG. 2;

if the bidirectional switch unit 1022 in only one of the three bridge arm branches fails, the switch devices 1021 in the other two fault-free bridge arm branches are closed, and only two bridge arm branches in the rectifying circuit 102 are conductive, and the operating mode is single-phase Vienna rectification operating mode; an equivalent circuit in this operating mode is shown in FIG. 3;

if the bidirectional switch units 1022 in at least two of the three bridge arm branches fail, none of the three switch devices 1021 are closed, all the three bridge arm branches are non-conductive, and the operating mode is three-phase uncontrolled rectification operating mode; an equivalent circuit in this operating mode is shown in FIG. 4.

Figure 5:
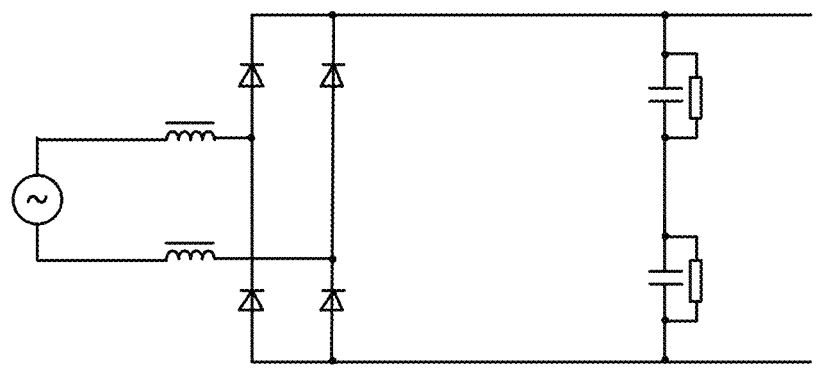
FIG. 5 is an equivalent circuit diagram of the rectification control system of the embodiment in a single-phase uncontrolled rectification operating mode.

In some embodiments, when the voltage input format is the single-phase AC input, the control unit 40 is further configured as follows:

if neither of the bidirectional switch units 1022 in the two bridge arm branches connected to the AC voltage fails, the switch devices 1021 in the two bridge arm branches connected to the AC voltage are closed, and only two bridge arm branches in the rectifying circuit 102 are conductive, and the operating mode is the single-phase Vienna rectification operating mode; an equivalent circuit in this operating mode is shown in FIG. 3;

if at least one bidirectional switch unit 1022 in the two bridge arm branches connected to the AC voltage fails, none of the three switch devices 1021 are closed, all the three bridge arm branches are non-conductive, and the operating mode is single-phase uncontrolled rectification operating mode; an equivalent circuit in this operating mode is shown in FIG. 5.

Figure 6:
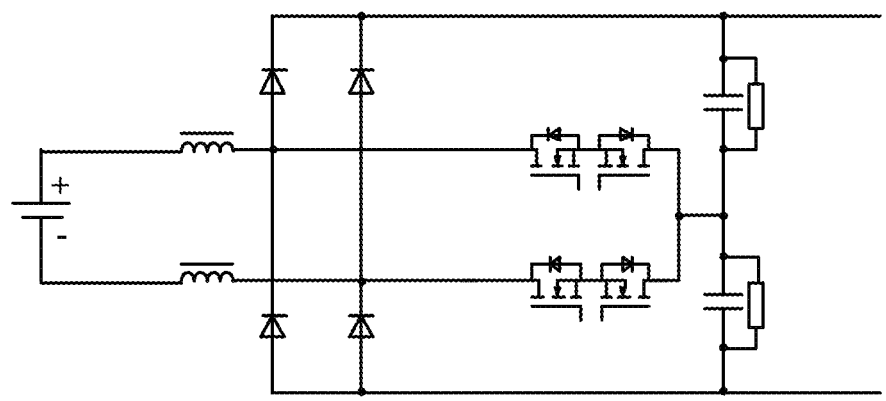
FIG. 6 is an equivalent circuit diagram of the rectification control system of the embodiment in a DC/DC Boost operating mode.
Figure 7:
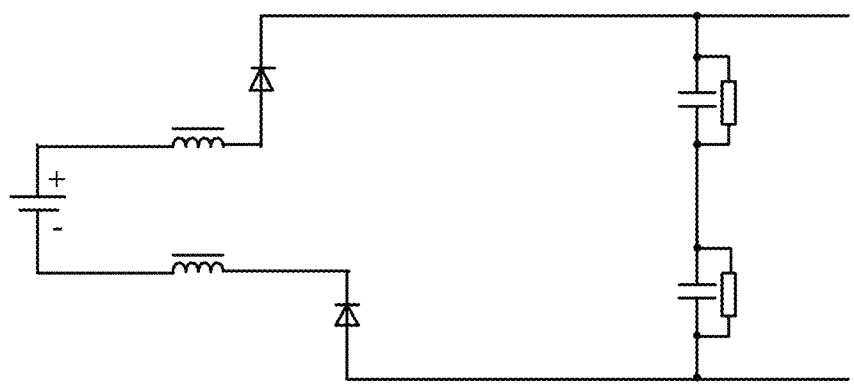
FIG. 7 is an equivalent circuit diagram of the rectification control system of the embodiment in a DC input operating mode.

In some embodiments, when the voltage input format is the DC input, the control unit 40 is further configured as follows:

if neither of the bidirectional switch units 1022 in the two bridge arm branches connected to the DC voltage fails, the switch devices 1021 in the two bridge arm branches connected to the DC voltage are closed, and only the two bridge arm branches are conductive, and the operating mode is DC/DC Boost operating mode; an equivalent circuit in this operating mode is shown in FIG. 6;

if at least one bidirectional switch unit 1022 in the two bridge arm branches connected to the DC voltage fails, none of the three switch devices 1021 are closed, all the three bridge arm branches are non-conductive, and the operating mode is DC input operating mode; an equivalent circuit in this operating mode is shown in FIG. 7.

Figure 9:
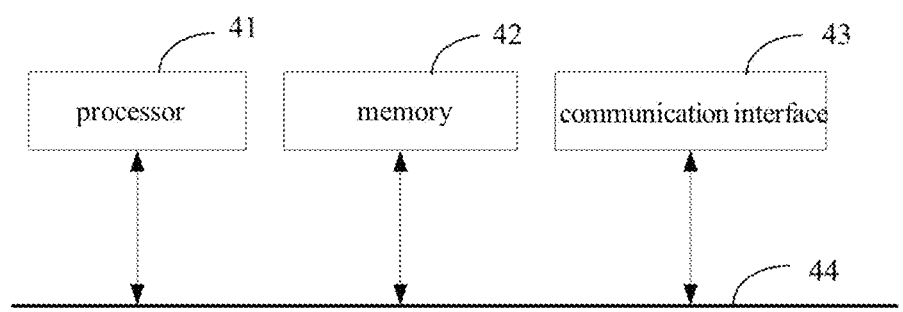
FIG. 9 is a structural block diagram of a processor and a memory in the rectification control system provided in an embodiment of the present application.

As shown in FIG. 9, the control unit 40 comprises at least one processor 41. Optionally, the processor 41 is a Central Processing Unit (CPU) or an Application Specific Integrated Circuit (ASIC), or may be configured to be one or more integrated circuits to implement the embodiments of the present application.

The rectification control system also comprises a memory 42. By way of example and not limitation, the memory 42 may include a Hard Disk Drive (HDD), a floppy disk drive, a Solid State Drive (SSD), a flash memory, an optical disk, a magneto-optical disk, a magnetic tape, or a Universal Serial Bus (USB) drive, or a combination of two or more of these. In some embodiments, the memory 42 is a non-volatile memory. In some embodiments, the memory 42 includes a Read-Only Memory (ROM) and a Random Access Memory (RAM).

The memory 42 may be used to store or cache various data files required for processing and/or communication, as well as possible computer program instructions executed by the processor 41.

The processor 41 implements any one of the functions of the control unit 40 described in the above embodiments by reading and executing computer program instructions stored in the memory 42.

The control unit integrates and analyzes the data from the voltage acquisition unit and the fault detection unit, and controls the conductive and non-conductive states of the three bridge arm branches to switch between different circuits according to the voltage input format and the current status of the rectifying circuit. This allows compatibility with three different scenarios of DC input, single-phase AC input and three-phase AC input and has six different operating modes, which expands the application range of the Vienna rectifier and improves flexibility.

In some embodiments, as shown in FIG. 9, the rectification control system may further comprise a communication interface 43 and a bus 44. The processor 41, the memory 42, and the communication interface 43 are connected through the bus 44 and communicate with each other.

The communication interface 43 is used to implement communication between various components, units and/or devices in the embodiment of the present application. The communication interface 43 can also implement data communication with other components such as: external devices, image/data acquisition devices, databases, external storage, and image/data processing workstations.

The bus 44 includes hardware, software or both, and couples the components of the rectification control system to each other. The bus 44 includes but is not limited to at least one of the following: a data bus, an address bus, a control bus, an expansion bus, and a local bus.

A second aspect of the present application provides a charger, which comprises the rectification control system according to any embodiment of the first aspect described above, so that the charger is not only limited to the occasion of three-phase AC input, but can be compatible with three voltage input formats of DC, single-phase AC and three-phase AC at the same time, and has six corresponding operating modes, which expands the application range of the charger, improves the application flexibility, and can meet the convenient needs of timely charging.

Figure 8:
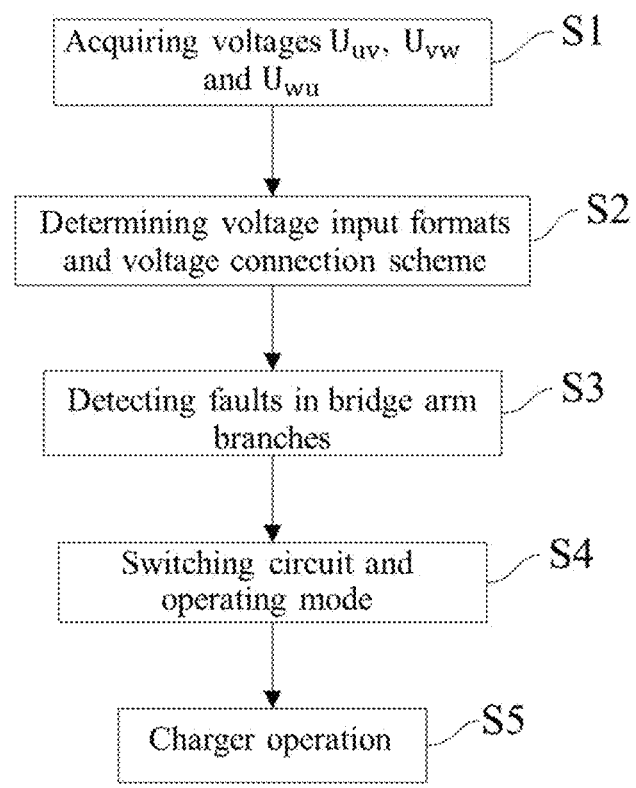
FIG. 8 is a flow chart of a control method for a charger provided in an embodiment of the present application.

A third aspect of the present application provides a control method for a charger, which adopts the rectification control system as described in any one of the above embodiments. As shown in FIG. 8, the method comprises the following steps:

S1 acquiring voltages: acquiring the voltage $U_{uv}$ between the u terminal and the v terminal, the voltage $U_{vw}$ between the v terminal and the w terminal, and the voltage $U_{wu}$ between the w terminal and the u terminal;

S2 determining voltage input formats and voltage connection scheme: if $U_{uv}$, $U_{vw}$ and $U_{wu}$ are all AC voltages, the voltage input format is determined to be three-phase AC input, and the voltage connection scheme is determined to be $u_{vw}$ connection; if only one of $U_{uv}$, $U_{vw}$ and $U_{wu}$ is an AC voltage, the voltage input format is determined to be single-phase AC input, where if $U_{uv}$ is an AC voltage, the voltage connection scheme is determined to be uv connection, if $U_{vw}$ is an AC voltage, the voltage connection scheme is determined to be vw connection, if $U_{wu}$ is an AC voltage, the voltage connection scheme is determined to be wu connection; if only one of $U_{uv}$, $U_{vw}$ and $U_{wu}$ is a DC voltage, the voltage input format is determined to be DC input, where if $U_{uv}$ is a DC voltage, the voltage connection scheme is determined to be uv connection, if $U_{vw}$ is a DC voltage, the voltage connection scheme is determined to be vw connection, and if $U_{wu}$ is a DC voltage, the voltage connection scheme is determined to be wu connection;

S3 detecting faults in the bridge arm branches: detecting whether any of the bidirectional switch units in the three bridge arm branches fails, if a fault is detected, determining the bridge arm branch where the fault occurs is faulty.

S4 switching circuit and operating mode:

when the voltage input format is the three-phase AC input, if none of the three bridge arm branches fail, closing the three switch devices to select the three-phase Vienna rectification operating mode; if only one of the three bridge arm branches fails, closing the switch devices in the other two fault-free bridge arm branches to select the single-phase Vienna rectification operating mode; if at least two of the three bridge arm branches fail, keeping the three switch devices in an open state to select the three-phase uncontrolled rectification operating mode;

when the voltage input format is the single-phase AC input, if neither of two bridge arm branches connected to the AC voltage fails, closing the switch devices in the two bridge arm branches connected to the AC voltage to select the single-phase Vienna rectification operating mode; if at least one of the two bridge arm branches connected to the AC voltage fails, keeping the three switch devices in an open state to select the single-phase uncontrolled rectification operating mode;

when the voltage input format is the DC input, if neither of two bridge arm branches connected to the DC voltage fails, closing the switch devices in the two bridge arm branches connected to the DC voltage to select the DC/DC Boost operating mode; if at least one of the two bridge arm branches connected to the DC voltage fails, keeping the three switch devices in an open state to select the DC input operating mode;

S5 charger operation: according to the selected operating mode, starting the charger to operate and output DC voltage.

The control method for the charger provided in the third aspect of the present application controls the conductive and non-conductive states of the three bridge arm branches to switch between different circuits according to the voltage input format and the current status of the rectifying circuit. This allows compatibility with three different scenarios of DC input, single-phase AC input and three-phase AC input and has six different operating modes, which expands the application range of the charger and improves the application flexibility, and can meet the convenient needs of timely charging under different operating conditions.

It can be understood that the rectification control system further comprises a current acquisition unit 50, which collects current data during the control process to be used in the corresponding operating mode control. It should be noted that, regarding the specific control methods for the six operating modes mentioned above that may have not been described, those skilled in the art can reasonably implement them using any known methods, and this application does not elaborate in detail.

Additionally, in conjunction with the control method for the charger in the above embodiments, a fourth aspect of the present application provides a non-transitory computer-readable storage medium. The non-transitory computer-readable storage medium stores computer program instructions; when the computer program instructions are executed by the processor, the control method for the charger in any one of the above embodiments is implemented.

The technical features of the above-described embodiments may be arbitrarily combined. To make the description concise, not all possible combinations of the technical features in the above-described embodiments are described. However, any combination of these technical features, as long as they do not conflict, should be considered within the scope of this disclosure.

The above-described embodiments merely represent several embodiments of the present application, and are described in a more specific and detailed manner. However, they should not be understood as limiting the scope of the claimed invention. It should be noted that, for those skilled in the art, several modifications and improvements can be made without departing from the spirit of the present application, and these are all within the protection scope of the present application. Therefore, the protection scope of the present application should be defined by the appended claims.

The invention claimed is:

1. A rectification control system, comprising:
a Vienna rectifier, which comprises:
three input terminals, namely a u terminal, a v terminal and a w terminal;
two output terminals, namely a dc+ terminal and a dc− terminal;
an output capacitor circuit, coupled between the two output terminals, the output capacitor circuit comprising a first capacitor C1 and a second capacitor C2 connected in series and an intermediate node located between the first capacitor C1 and the second capacitor C2;
a rectifying circuit, comprising three bridge arm branches, namely a u-phase bridge arm branch connected between the u terminal and the intermediate node, a v-phase bridge arm branch connected between the v terminal and the intermediate node, and a w-phase bridge arm branch connected between the w terminal and the intermediate node, each of the bridge arm branches comprising a switch device and a bidirectional switch unit connected in series;

a voltage acquisition unit, connected to the three input terminals and configured to acquire a voltage $U_{uv}$ between the u terminal and the v terminal, a voltage $U_{vw}$ between the v terminal and the w terminal, and a voltage $U_{wu}$ between the w terminal and the u terminal;

a fault detection unit, connected to bidirectional switch units and configured to detect whether any of the bidirectional switch units fails;

a control unit, connected to the voltage acquisition unit and the fault detection unit, and configured to determine a voltage input format and a voltage connection scheme according to voltages acquired by the voltage acquisition unit, and control closing or opening of three switch devices to switch circuit and operating mode according to the voltage input format, the voltage connection scheme and a detection result of the fault detection unit;

wherein the control unit is further configured to:

when the voltages $U_{uv}$, $U_{vw}$ and $U_{wu}$ acquired by the voltage acquisition unit are all AC voltages, determine the voltage input format as three-phase AC input;

when only one of the voltages $U_{uv}$, $U_{vw}$ and $U_{wu}$ acquired by the voltage acquisition unit is an AC voltage, determine the voltage input format as single-phase AC input;

when only one of the voltages $U_{uv}$, $U_{vw}$ and $U_{wu}$ acquired by the voltage acquisition unit is a DC voltage, determine the voltage input format as DC input.

2. The rectification control system according to claim 1, wherein when the voltage input format is the three-phase AC input, the control unit is further configured to:

if none of the bidirectional switch units in the three bridge arm branches fail, close the three switch devices, and the operating mode is three-phase Vienna rectification operating mode;

if the bidirectional switch unit in only one of the three bridge arm branches fails, close the switch devices in the other two fault-free bridge arm branches, and the operating mode is single-phase Vienna rectification operating mode;

if the bidirectional switch units in at least two of the three bridge arm branches fail, keep the three switch devices in an open state, and the operating mode is three-phase uncontrolled rectification operating mode.

3. The rectification control system according to claim 1, wherein when the voltage input format is the single-phase AC input, the control unit is further configured to:

if neither of the bidirectional switch units in two bridge arm branches connected to the AC voltage fails, close the switch devices in the two bridge arm branches connected to the AC voltage, and the operating mode is single-phase Vienna rectification operating mode;

if at least one bidirectional switch unit in the two bridge arm branches connected to the AC voltage fails, keep the three switch devices in an open state, and the operating mode is single-phase uncontrolled rectification operating mode.

4. The rectification control system according to claim 1, wherein when the voltage input format is the DC input, the control unit is further configured to:

if neither of the bidirectional switch units in two bridge arm branches connected to the DC voltage fails, close the switch devices in the two bridge arm branches connected to the DC voltage, and the operating mode is DC/DC Boost operating mode;

if at least one bidirectional switch unit in the two bridge arm branches connected to the DC voltage fails, keep the three switch devices in an open state, and the operating mode is DC input operating mode.

5. The rectification control system according to claim 1, wherein the switch devices are single-stage contactors, and each of the bidirectional switch units comprises two switch tubes connected in reverse series.

6. The rectification control system according to claim 1, wherein the Vienna rectifier further comprises a filtering circuit, the filtering circuit comprises three inductors, each of the three inductors is connected between one of the input terminals and one of the bridge arm branches.

7. The rectification control system according to claim 6, wherein further comprises three groups of diodes respectively connected to the three inductors, each group of diodes comprises a first diode and a second diode, an anode of the first diode is connected to respective inductor, a cathode of the first diode is connected to the dc+ terminal, an anode of the second diode is connected to the dc-terminal, and a cathode of the second diode is connected to the respective inductor.

8. A charger, comprising the rectification control system according to claim 1.

9. A control method for a charger, which adopts the rectification control system according to claim 1, comprising following steps:

said acquiring voltages: acquiring the voltage $U_{uv}$ between the u terminal and the v terminal, the voltage $U_{vw}$ between the v terminal and the w terminal, and the voltage $U_{wu}$ between the w terminal and the u terminal;

said determining the voltage input format and the voltage connection scheme: if $U_{uv}$, $U_{vw}$ and $U_{wu}$ are all AC voltages, determining the voltage input format as three-phase AC input, and the voltage connection scheme as $U_{vw}$ connection; if only one of $U_{uv}$, $U_{vw}$ and $U_{wu}$ is an AC voltage, determining the voltage input format as single-phase AC input, where if $U_{uv}$ is the AC voltage, determining the voltage connection scheme as uv connection, if $U_{vw}$ is the AC voltage, determining the voltage connection scheme as vw connection, if $U_{wu}$ is the AC voltage, determining the voltage connection scheme as wu connection; if only one of $U_{uv}$, $U_{vw}$ and $U_{wu}$ is a DC voltage, determining the voltage input format as DC input, where if $U_{uv}$ is the DC voltage, determining the voltage connection scheme as uv connection, if $U_{vw}$ is the DC voltage, determining the voltage connection scheme as vw connection, if $U_{wu}$ is the DC voltage, determining the voltage connection scheme as wu connection;

said detecting faults in the bridge arm branches: detecting whether any of the bidirectional switch units in the three bridge arm branches fails, and if a fault is detected, determining the bridge arm branch where the fault occurs is faulty;

said switching circuit and operating mode:

when the voltage input format is the three-phase AC input, if none of the three bridge arm branches fail, closing the three switch devices to select three-phase Vienna rectification operating mode; if only one of the three bridge arm branches fails, closing the switch devices in the other two fault-free bridge arm branches to select single-phase Vienna rectification operating mode; if at least two of the three bridge arm branches fail, keeping the three switch devices in an open state to select three-phase uncontrolled rectification operating mode;

when the voltage input format is the single-phase AC input, if neither of two bridge arm branches connected to the AC voltage fails, closing the switch devices in the two bridge arm branches connected to the AC voltage to select the single-phase Vienna rectification operating mode; if at least one of the two bridge arm branches connected to the AC voltage fails, keeping the three switch devices in an open state to select single-phase uncontrolled rectification operating mode;

when the voltage input format is the DC input, if neither of two bridge arm branches connected to the DC voltage fails, closing the switch devices in the two bridge arm branches connected to the DC voltage to select DC/DC Boost operating mode; if at least one of the two bridge arm branches connected to the DC voltage fails, keeping the three switch devices in an open state to select DC input operating mode;

charger operation: according to the selected operating mode, starting the charger to operate and output DC voltage.

* * * * *